US006236921B1

United States Patent
McConnell

(10) Patent No.: US 6,236,921 B1
(45) Date of Patent: May 22, 2001

(54) THREE SPEED ALGORITHM FOR AIRBAG SENSOR ACTIVATION

(75) Inventor: Douglas Allan McConnell, Rochester Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/366,939

(22) Filed: Aug. 4, 1999

(51) Int. Cl.$^7$ ............................................. B60R 21/01
(52) U.S. Cl. ........................................... 701/45; 280/735
(58) Field of Search ................... 701/45, 46; 280/728.1, 280/734, 735

(56) References Cited

U.S. PATENT DOCUMENTS

| | | |
|---|---|---|
| 4,994,972 | 2/1991 | Diller . |
| 5,014,810 | 5/1991 | Mattes et al. . |
| 5,021,678 | 6/1991 | Diller . |
| 5,040,118 | 8/1991 | Diller . |
| 5,157,268 | 10/1992 | Spies et al. . |
| 5,216,607 | 6/1993 | Diller et al. . |
| 5,229,943 | 7/1993 | Eigler et al. . |
| 5,282,134 | 1/1994 | Gioutsos et al. . |
| 5,337,238 | 8/1994 | Gioutsos et al. . |
| 5,363,302 | 11/1994 | Allen et al. . |
| 5,394,326 | 2/1995 | Liu . |
| 5,407,228 | 4/1995 | Shibata et al. . |
| 5,483,449 | 1/1996 | Caruso et al. . |
| 5,490,066 | 2/1996 | Gioutsos et al. . |
| 5,490,067 | 2/1996 | Teguri et al. . |
| 5,498,028 | 3/1996 | Carlin et al. . |
| 5,504,379 | 4/1996 | Mazur et al. . |
| 5,508,918 | 4/1996 | Gioutsos . |
| 5,508,920 | 4/1996 | Gioutsos et al. . |
| 5,515,276 | 5/1996 | Kura et al. . |
| 5,519,613 | 5/1996 | Gioutsos et al. . |
| 5,521,822 | 5/1996 | Wang . |
| 5,530,649 | 6/1996 | Fujishima . |
| 5,542,700 | 8/1996 | Shibata et al. . |
| 5,559,697 | 9/1996 | Wang . |
| 5,563,791 | 10/1996 | Gioutsos et al. . |
| 5,587,906 | 12/1996 | McIver et al. . |
| 5,594,647 | 1/1997 | Yasuda et al. . |
| 5,608,628 | 3/1997 | Drexler et al. . |
| 5,629,847 | 5/1997 | Shirakawa et al. . |
| 5,668,740 | 9/1997 | Wang et al. . |
| 5,702,124 | 12/1997 | Foo et al. . |
| 5,899,948 | 5/1999 | Raphael et al. . |
| 6,076,028 | * 6/2000 | Donnelly et al. .................. 701/45 |

* cited by examiner

*Primary Examiner*—Michael J. Zanelli
(74) *Attorney, Agent, or Firm*—Mark L. Mollon

(57) ABSTRACT

A system and method for controlling deployment of an inflatable passenger restraint. Acceleration of a passenger compartment is monitored, and first, second and third terms are determined based on a different average accelerations of the passenger compartment. The terms are compared to respective thresholds, and a first signal is generated if at least one of the first, second or third thresholds is exceeded. If the first signal is generated and the velocity of the passenger compartment exceeds a velocity threshold with offset, the inflatable restraint is deployed.

19 Claims, 2 Drawing Sheets

THREE SPEED ALGORITHM FOR AIRBAG SENSOR ACTIVATION

TECHNICAL FIELD

This invention relates to systems and methods for detecting a crash event and determining whether to deploy an inflatable passenger restraint.

BACKGROUND ART

A number of systems and methods for actuating vehicular safety devices are well known in the art. Typically, a sensor is used to determine vehicle acceleration (and therefore deceleration). The signal is processed to determine when to activate various passive safety devices, such as inflatable restraints and safety belt pre-tensioners.

To provide optimum protection for the passengers of the vehicle, it is important to accurately and expeditiously determine the relative severity of a crash event to allow sufficient time for the deployment of an inflatable restraint. It is also important to refrain from deploying an inflatable restraint for crash events in which the restraint would not benefit the passengers. Such events may include low-velocity impacts and the like.

Most current frontal airbag deployment algorithms for discrimination of must-fire pole events from no-fire events rely on the use of jerk or length of acceleration. This dependence reduces the effectiveness of those algorithms from reliably discriminating must-fire pole events from no-fire crashes, namely, no-fire car-to-car and no-fire pole crashes. In addition, current algorithms are sensitive to high impact rough road events which result in either inadvertent deployment or longer discrimination times for high speed frontal events.

DISCLOSURE OF THE INVENTION

It is thus a general object of the present invention to provide a method and system for accurately detecting a crash event and determining whether to deploy an inflatable passenger restraint which provides improved discrimination.

In carrying out the above object and other objects, features and advantages of the present invention, a method for controlling deployment of an inflatable restraint disposed within a passenger compartment of a vehicle is provided. The method comprises monitoring acceleration of the passenger compartment, and determining first, second and third terms based on a average accelerations of the passenger compartment. The first, second and third terms are compared to respective thresholds, and a signal is generated if at least one of the first, second or third thresholds is exceeded. If a velocity threshold with offset is also exceeded, the inflatable restraint deploys.

A system is also provided for controlling deployment of an inflatable restraint.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
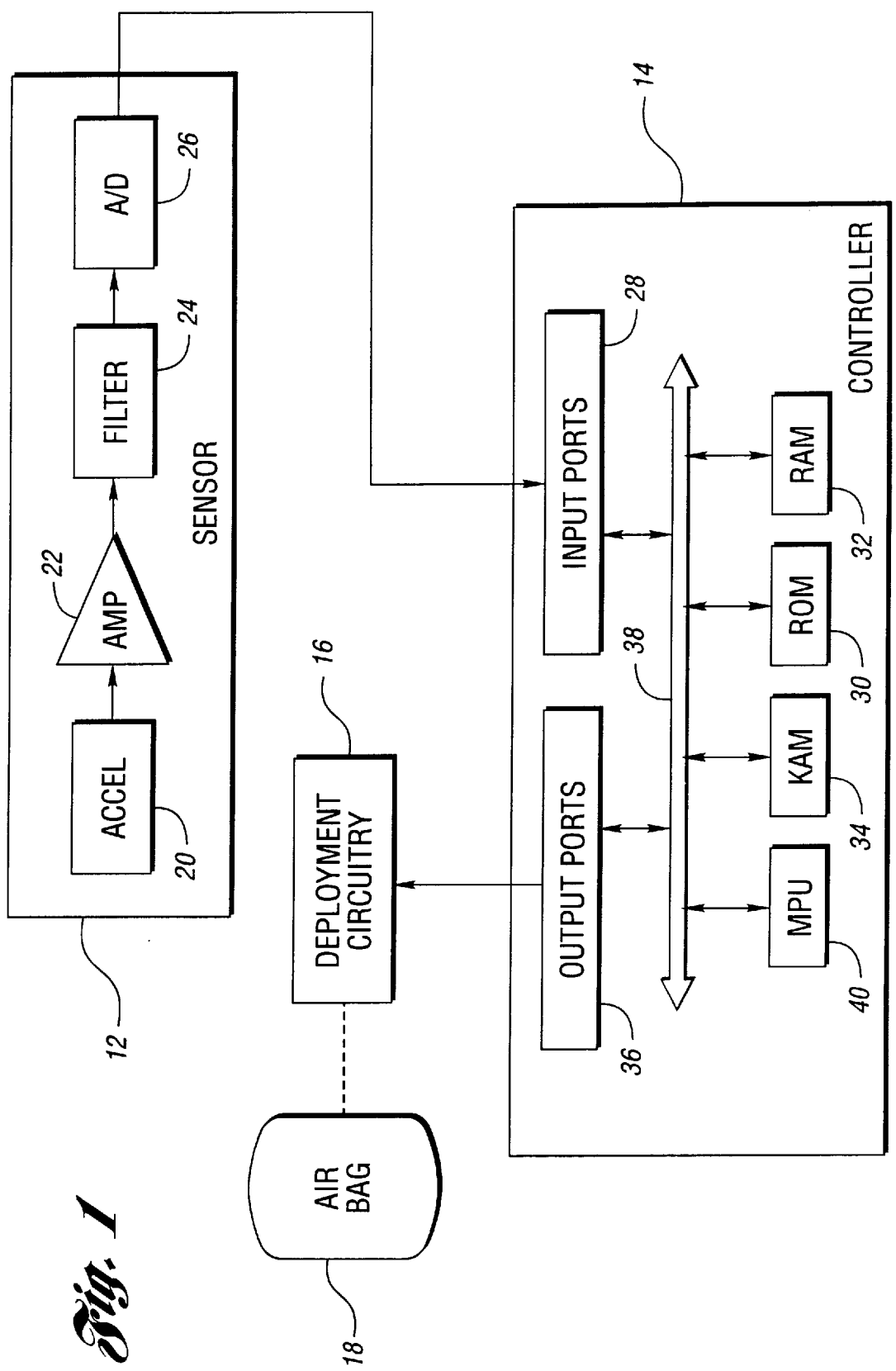
FIG. 1 is a block diagram of a system for controlling deployment of an inflatable restraint according to the present invention.

FIG. 1 shows a system for actuating a passive restraint device disposed within a passenger compartment of a vehicle. The system includes a sensor 12 which produces a signal indicative of acceleration of the passenger compartment. Preferably, sensor 12 is disposed within the passenger compartment so that the sensed acceleration is nearly identical to that experienced by the vehicle occupants. As will be appreciated by one of ordinary skill in the art, acceleration during a crash event is generally negative acceleration or deceleration. Depending on the particular orientation and type of sensor utilized, either a positive voltage or a negative voltage signal may be used to represent acceleration or deceleration for crash discrimination. In a preferred embodiment, sensor 12 generates a positive voltage signal as the passenger compartment decelerates.

Sensor 12 communicates with a controller 14 which monitors and periodically samples the signal generated by sensor 12. Controller 14 processes the sensor signal to determine when to generate a signal for deployment circuitry 16 to activate a passenger restraint, such as air bag 18.

Sensor 12 includes various components such as an accelerometer 20, an amplifier 22, a filter 24, and an analog to digital converter 26. Accelerometer 20 produces a signal which is amplified by amplifier 22, filtered and averaged to reduce high frequency noise by filter 24, and converted to a digital signal by analog to digital converter 26. The digital signal is provided to controller 14 via input ports 28.

Controller 14 preferably includes various computer readable media such as read only memory (ROM) 30, random access memory (RAM) 32, and keep alive memory (KAM) 34 for storing various data and instructions. The computer readable media communicate with input ports 28 and output ports 36 via a control and data bus 38. A microprocessor 40 executes control logic implemented by software or program instructions stored in at least one of the computer readable media to monitor the sensor signal and generate an appropriate signal for deployment circuitry 16 via output ports 36.

The computer readable media illustrated in FIG. 1 may be implemented by any of a variety of well known devices such as EPROM, EEPROM, flash memory or the like. Preferably, program instructions are stored in ROM 30. Various control parameters and thresholds used in determining whether to deploy air bag 18 may also be stored in ROM 30. RAM 32 may be used for various working calculations and other temporary storage of information. KAM 34 may be used to store acceleration data generated by sensor 12 over various time periods, as explained in greater detail below. Alternatively, RAM 32 may be used to implement one or more storage buffers, although this information would be lost upon resetting the controller. In contrast, values stored in KAM 34 are maintained without power being applied to the system.

Figure 2:
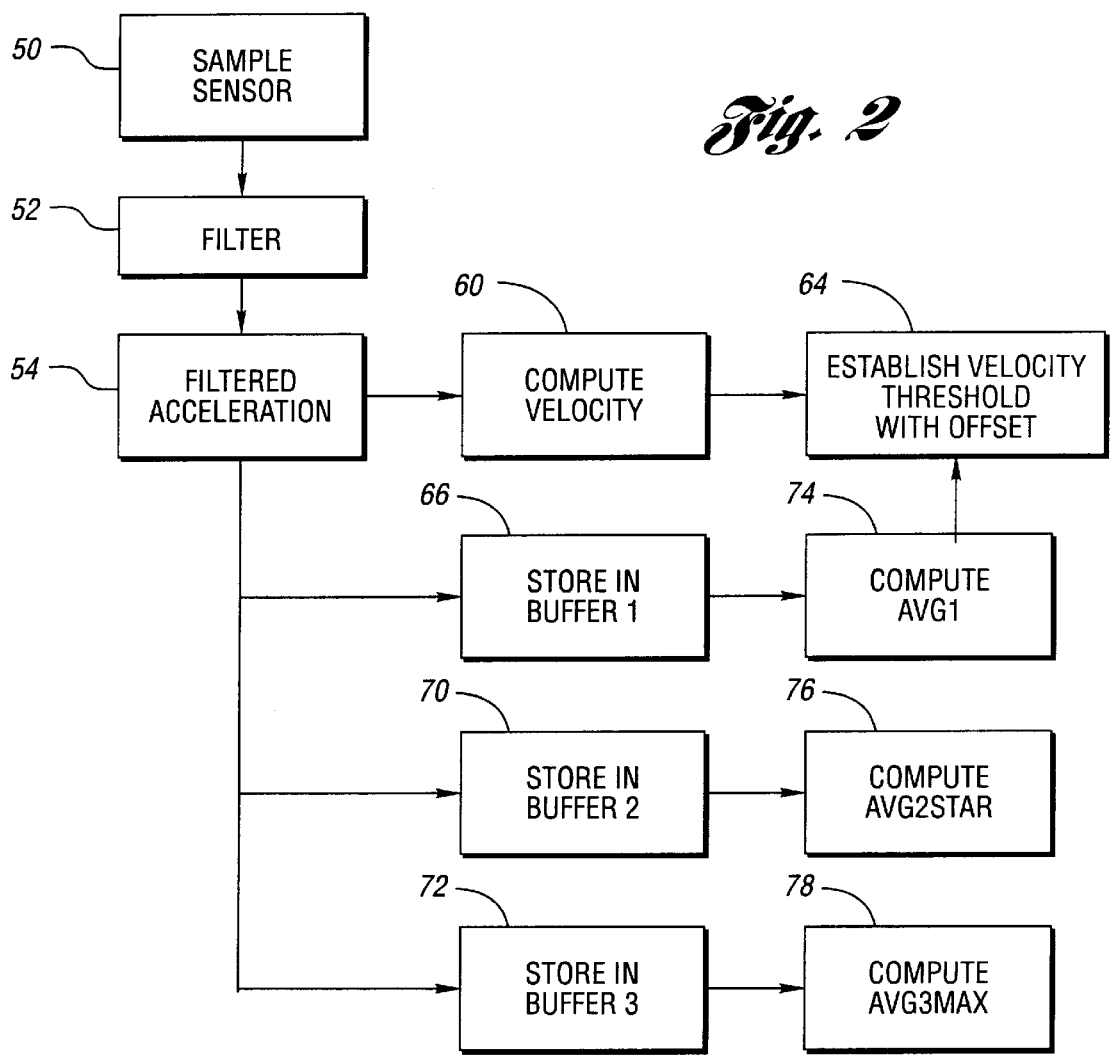
FIG. 2 is a flow diagram illustrating control logic for a system or method of controlling deployment of an inflatable restraint according to the present invention.
Figure 3:
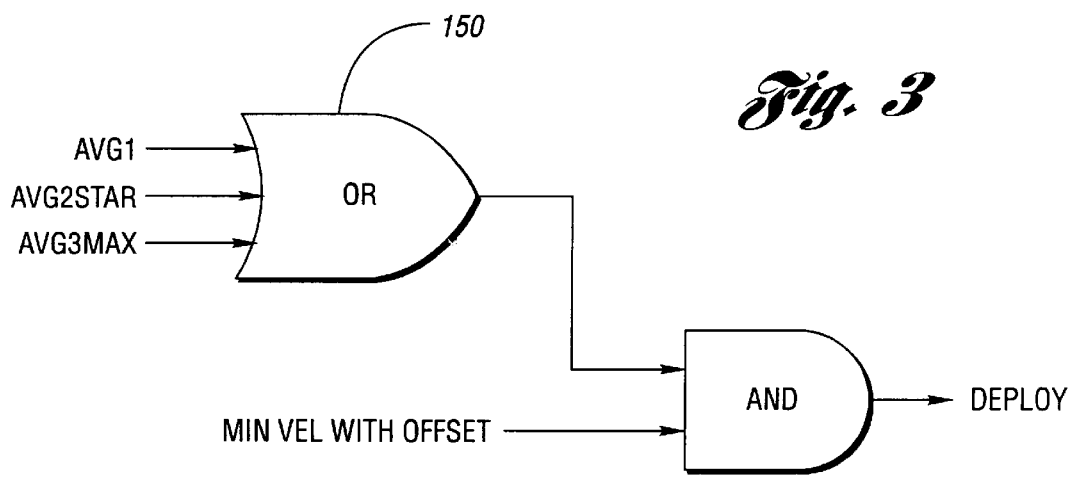
FIG. 3 is an alternative representation of control logic for generating a signal to deploy an inflatable restraint according to the present invention.

FIGS. 2 and 3 illustrate operation of a system or method for controlling deployment of an inflatable restraint according to the present invention. As will be appreciated by one of ordinary skill in the art, the flow diagrams represent control logic which may be implemented in hardware, software, or a combination of hardware and software. Preferably, control logic is stored in at least one computer readable medium, such as a PROM, EPROM, EEPROM, or flash memory, and represents program instructions which may be executed by a microprocessor. Of course, other implementations of the control logic using discrete components and/or custom integrated circuits, such as ASICs are possible without departing from the spirit or scope of the present invention. One of ordinary skill in the art will also recognize that the particular order or sequence illustrated is not necessarily required to achieve the goals and objects of the present invention. The order depicted in the figures has been chosen for ease of illustration and description only. As such, various programming and processing strategies may be used depending upon the requirements of the particular application.

Block 50 of FIG. 2 represents sampling of the signal produced by the sensor. The samples are filtered and clipped as represented by block 52. Preferably, the sensor values are limited to representations of 50 g for vehicle deceleration and 33 g for vehicle acceleration. The filtered samples represent the filtered acceleration data available for crash event discrimination and deployment decisions as represented by block 54. The filtered samples are stored in a number of ring buffers each having different lengths. In effect, the length of the each respective ring buffer performs a filtering function having a different frequency response. Further details are available in U.S. Pat. No. 5,899,948, assigned to the assignee of the present invention and hereby incorporated by reference.

The filtered acceleration samples are also used to compute the velocity of the passenger compartment as represented by block 60. The velocity is an approximation of the integral of the acceleration. The velocity is also offset as indicated by block 64 and described below. This velocity with offset is used as a threshold as explained in greater detail below.

The filtered acceleration samples generated by block 54 are stored in various ring buffers such as represented by blocks 66, 70 and 72. The ring buffers are essentially first in, first out (FIFO) buffers of various lengths such that a predetermined number of previously received values are stored. Once the buffer is full, each subsequently received value eliminates the oldest value in the buffer. In one embodiment, buffer 3 includes a greater number of values than buffer 2 which has a greater number of values than buffer 1. Values based on the numbers stored in the corresponding buffers are computed by blocks 74, 76 and 78, and then compared to various distance-based thresholds as described below.

AVG1 is a relatively fast term to provide rapid response to high impact and high speed events, and is based on average acceleration using a fast ring buffer of preferably around 4 ms. If this averaged acceleration exceeds a threshold, for example 6.5 g, then the velocity threshold is offset by a settable, normally constant amount as shown by block 64. The algorithm then waits for a major reversal in acceleration. This is accomplished by storing a maximum average acceleration and looking for when the average acceleration drops below that maximum by a certain percentage of the maximum, for instance 10%. If this occurs, the velocity threshold in block 64 is decremented by a settable, normally constant amount back toward the original threshold level. This allows the velocity threshold to "walk around" high impact rough road events.

A moderate term AVG2STAR is also based on average acceleration, but uses a ring buffer of around 8 ms. The moderate term employs a crush calculation that looks at the time it takes a deceleration pulse to achieve significant reversal, or crush, after crossing a minimum threshold. If the crush is achieved within a given time period, preferably as measured from the point at which the second average acceleration exceeds a given lower threshold, the second averaged acceleration is adjusted by a scaled, constant factor divided by the speed of achieving the crush. This calculation is then compared for discrimination to a physically-based threshold, e.g., distance. In particular, the second average acceleration AVG2 starts the moderate term calculation by exceeding a lower threshold. A second maximum average acceleration AVG2MAX is stored and, if it exceeds a threshold AVG2MAXMIN and the second average acceleration thereafter falls by more than a certain percentage (i.e. crush met), a crush factor CF is calculated equal to the scaled constant divided by the change in time from when AVG2 exceeds the lower threshold until crush is met. AVG2MAX is then multiplied by the crush factor CF, and that quantity is added to AVG2MAX to establish AVG2STAR. If AVG2STAR crosses a second distance-based threshold, and the minimum velocity with offset threshold is exceeded, the algorithm indicates that the airbag should deploy. A post-window is also provided on the crush factor CF which returns AVG2STAR to AVG2MAX.

A third, relatively slow maximum acceleration term AVG3MAX has a relatively long buffer length of about 24 ms to minimize noise affects, and primarily discriminates pole crashes from no-fire crashes. A third distance-based threshold is offset from AVG3MAX until AVG3MAX levels out or flattens for a certain length of time. The offset is then made constant and the third threshold behaves like a typical distance-based threshold for the rest of the event. The leveling out is determined by calculating an average of AVG3MAX and looking for that flatness to fall below a settable level for a settable length of time. As stated above, when this occurs the offset is made constant. The physical phenomenon exploited in this event is the fact that the must-fire pole event normally hits the engine block, and the no-fire pole event normally does not. In addition, other no-fire events normally do not have a significant later deceleration pulse as do the must-fire pole events. The distance-based threshold helps avoid firing on these no-fire events. If AVG3MAX gets too large, the distance offset is limited to a maximum value. This helps discriminate higher energy events that may not meet the other criteria.

FIG. 3 shows an alternative representation of control logic according to the present invention. A signal is generated to actuate a passive restraint device when the conditions necessary for any one of the three inputs to block 150 are satisfied, and if the velocity exceeds the minimum velocity with offset. The conditions necessary to generate a deploy decision via block 150 include AVG1 exceeding the first distance-based threshold, AVG2STAR exceeding the second distance-based threshold, or AVG3MAX exceeding its associated third distance-based threshold.

The fast, moderate and slow terms thus provide independent crash discrimination. The algorithm robustly provides timely discrimination of crash modes, including no-fire pole events and car-to-car crashes, and impact type rough road events. The fast term discriminates high speed impacts from impact type rough road events; the moderate term discriminates threshold must-fire events (car-to-car, frontal, angular) from threshold no-fire events; and the slow term discriminates must-fire pole events from no-fire events. The major physical phenomenon exploited is the crush experienced by must-fire and high speed events. The algorithm looks for one major reversal and, based on how quickly the reversal occurs and the amount of the reversal, adjusts other terms to make it easier to fire.

While the best mode for carrying out the invention has been described in detail, those familiar with the art to which this invention relates will recognize various alternative designs and embodiments for practicing the invention as defined by the following claims.

What is claimed is:

1. A method for determining a condition warranting deployment of an inflatable restraint disposed within a passenger compartment of a vehicle, the method comprising:

monitoring acceleration of the passenger compartment;

determining a first term based on a first average acceleration of the passenger compartment;

determining a second term based on a second average acceleration of the passenger compartment;

determining a third term based on a third average acceleration of the passenger compartment;

comparing the first term to a first threshold;

comparing the second term to a second threshold;

comparing the third term to a third threshold;

generating a first signal indicative of the condition if at least one of the first, second and third thresholds is exceeded.

2. The method of claim 1 further comprising offsetting a velocity threshold based on the first average acceleration.

3. The method of claim 2 further comprising determining a velocity of the passenger compartment.

4. The method of claim 3 further comprising comparing the velocity to the velocity threshold with offset.

5. The method of claim 4 further comprising generating a second signal if the velocity exceeds the velocity threshold with offset.

6. The method of claim 5 further comprising deploying the inflatable restraint upon generation of the first signal and the second signal.

7. The method of claim 1 wherein the first term has a buffer length that is relatively short.

8. The method of claim 1 wherein the second term has a buffer length longer than a buffer length of the first term.

9. The method of claim 1 wherein the third term has a buffer length longer than a buffer length of the second term.

10. The method of claim 1 wherein the second threshold is distance-based.

11. The method of claim 1 wherein the third threshold is distance-based.

12. A system for determining a condition warranting deployment of an inflatable restraint disposed within a passenger compartment of a vehicle, the system comprising:

a sensor for indicating acceleration of the passenger compartment; and control logic in communication with the sensor to determine first, second, and third terms based on respective first, second, and third average accelerations of the passenger compartment, compare the first, second and third terms to respective first, second and third thresholds, and generate a first signal indicative of the condition if at least one of the first, second and third thresholds is exceeded.

13. The system of claim 12 wherein the control logic further offsets a velocity threshold based on the first average acceleration.

14. The system of claim 13 wherein the control logic further determines a velocity of the passenger compartment.

15. The system of claim 14 wherein the control logic further compares the velocity to the velocity threshold with offset.

16. The system of claim 15 wherein the control logic further generates a second signal if the velocity exceeds the velocity threshold with offset.

17. The system of claim 16 wherein the control logic further deploys the inflatable restraint upon generation of the first signal and the second signal.

18. The system of claim 12 wherein the second term has a buffer length longer than a buffer length of the first term.

19. The system of claim 12 wherein the third term has a buffer length longer than a buffer length of the second term.

* * * * *